United States Patent
Gezici et al.

(10) Patent No.: US 7,403,157 B2
(45) Date of Patent: Jul. 22, 2008

(54) RADIO RANGING USING SEQUENTIAL TIME-DIFFERENCE-OF-ARRIVAL ESTIMATION

(75) Inventors: Sinan Gezici, Princeton, NJ (US); Zafer Sahinoglu, Watertown, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 11/520,418

(22) Filed: Sep. 13, 2006

(65) Prior Publication Data

US 2008/0062043 A1    Mar. 13, 2008

(51) Int. Cl.
    *G01S 1/24* (2006.01)
(52) U.S. Cl. .................. 342/387; 342/442
(58) Field of Classification Search ............... 342/387, 342/434, 442, 450; 455/456.1, 457
    See application file for complete search history.

(56) References Cited

U.S. PATENT DOCUMENTS

| 5,659,520 A * | 8/1997 | Watson et al. ............... 367/125 |
| 2006/0062333 A1* | 3/2006 | Yan ............................. 375/340 |
| 2007/0153873 A1* | 7/2007 | Fullerton ..................... 375/130 |

* cited by examiner

*Primary Examiner*—Dao L Phan
(74) *Attorney, Agent, or Firm*—Dirk Brinkman; Clifton D. Mueller; Gene V. Vinokur

(57) ABSTRACT

A method determines a position of a target object. A window function is applied repeatedly to a first signal and a second signal of a pair of radio signals received at a pair of passive sensors from a target object while time shifting the window function during a correlation interval to produce a first windowed signal and a second windowed signal for each application. The first windowed signals are cross-correlating with the second windowed signals to determine a peak for each cross-correlation. The peaks are compared sequentially in time with a predetermined threshold to detect a first pulse in the first signal and a first pulse in the second signal. A delay between the first pulses indicative of a position of the target object.

9 Claims, 4 Drawing Sheets

RADIO RANGING USING SEQUENTIAL TIME-DIFFERENCE-OF-ARRIVAL ESTIMATION

FIELD OF THE INVENTION

The present invention relates generally to radio communication systems, and more particularly to radio ranging and a determining a position of a target object by measuring time differences between pairs of radio signals received from the target object.

BACKGROUND OF THE INVENTION

In a passive radar system, radio signals reflected or transmitted by a target object are received by multiple passive sensors geographically distributed. Passive sensors do not emit the radio signals that are reflected, as would be the case in an active radar system. The main problem with passive radar is that the relative timing of pulses in the received signals is unknown.

Usually, the passive sensors forward the received radio signals to a centralized processing unit. The processing unit performs a cross-correlation on pairs of signals to estimate a time-difference-of-arrival (TDOA) for pairs of the signals. The TDOA can then be used to determine the position of the target object.

FIG. 1 shows conventional cross-correlation processing. A first signal $r_1(t)$ 100 and a second signal $r_2(t)$ 101 are received at corresponding sensors geographically distributed. The radio signals were reflected or transmitted by a target object 105.

The signals can be forwarded to a centralized processing unit. At the processing unit, the first signal $r_1(t)$ 100 and the second signal $r_2(t)$ 101 are cross-correlated 110 over an entire correlation time interval T 102 according to a cross-correlation function R(x). Then, a peak detector 111 determines a peak of an absolute value x 103 of the cross-correlation function for the entire interval. The value x corresponds to the cross-correlation peak over the entire cross-correlation interval. The peak is then output as an estimate $\hat{\theta}$ 104 of the TDOA for signals $r_1(t)$ 100 and $r_2(t)$ 101.

Conventional cross-correlation processing evaluates a cross-correlation function for various delays between the signals to obtain the delay corresponding to a maximum cross-correlation value during the cross-correlation interval, i.e., a "peak."

The conventional cross-correlation processing works adequately for single path channels and additive white Gaussian (random) noise (AWGN). However, that processing does not account for the phenomena of fading, frequency selectivity, interference, nonlinearity, terrain blocking and dispersion. Therefore, the performance can degrade significantly in multipath environments, and in the presence of non-white noise, as is frequently the case in terrestrial channels.

In order to improve the performance of the conventional cross-correlation, generalized cross-correlation (GCC) techniques have been developed. Instead of determining the maximum cross-correlation value between a pair of signals, GCC techniques first filter the input signals and then operate on filtered versions of the signals. The combined effect can be considered as shaping the cross-power spectral density (cross-PSD) of the received signals.

Various filtering functions can be considered for improving the performance in the presence of uncorrelated noise. As is known in the art, a filter performs a multiplication in the frequency domain.

Although the GCC filtering techniques can improve TDOA estimation, they are ineffective for multipath propagation, which causes correlated noise in the received signals. In order to reduce the effects of multipath propagation, adaptive estimation techniques have been described. However, those techniques can also fail when there are more than three multipath components.

The conventional cross-correlation technique to estimate TDOA can be expressed as a delay $$\hat{\theta} = \operatorname*{argmax}_{x} |R(x)|, \qquad (1)$$

where $$R(x) = \int_0^T r_1(t) r_2(t-x) dt$$

is the cross-correlation function for the pair of signals $r_1(t)$ and $r_2(t)$, and T is the correlation time interval.

One problem with the conventional cross-correlation processing is that if the time interval T for the cross-correlation is not selected appropriately, i.e., longer than needed, extra noise can be accumulated. This is due to the nature of noise-noise cross-terms for low signal-to-noise ratios (SNRs).

In addition, in the presence of multipath propagation, multiple cross-correlation peaks can occur, which can increase the estimation error significantly. It is desired to solve these problems.

SUMMARY OF THE INVENTION

According to embodiments of the invention, time-domain windowing is used to perform threshold-based sequential TDOA estimation. The invention reduces errors due to multipath and non-line-sight propagation and noise-noise cross-terms.

A method determines a position of a target object. A window function is applied repeatedly to a first signal and a second signal of a pair of radio signals received at a pair of passive sensors from a target object while time shifting the window function during a correlation interval to produce a first windowed signal and a second windowed signal for each application.

The first windowed signals are cross-correlated with the second windowed signals to determine a peak for each cross-correlation. The peaks are compared sequentially in time with a predetermined threshold to detect a first pulse in the first signal and a first pulse in the second signal.

A delay between the first pulses indicative of a position of the target object.

DESCRIPTION OF THE PREFERRED EMBODIMENTS

The embodiments of our invention provide a method and system for determining a position of a target objects by measuring time delays between pairs of radio signals received from the target object by passive sensors.

Figure 1:
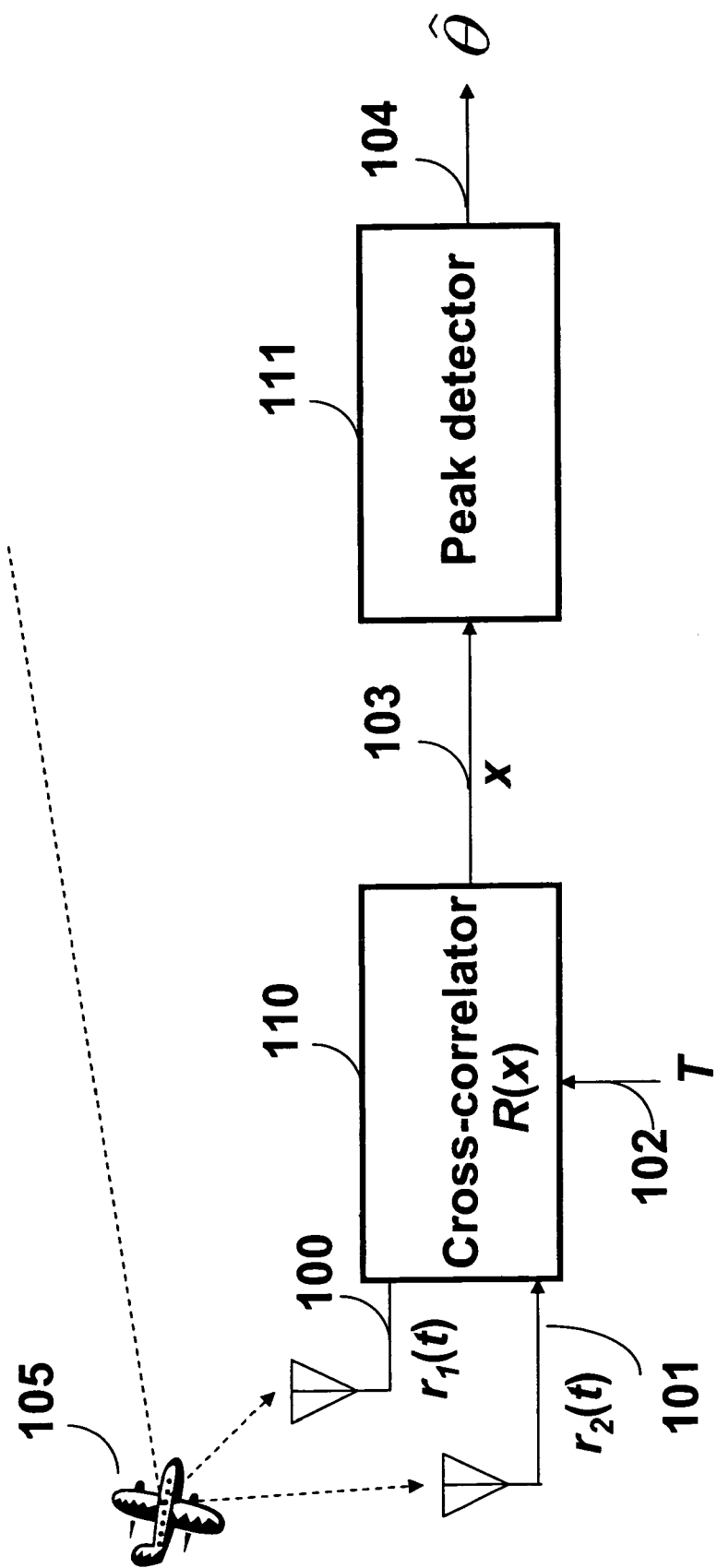
FIG. 1 is a block diagram of conventional cross-correlation processing for TDOA estimation.
Figure 2A:
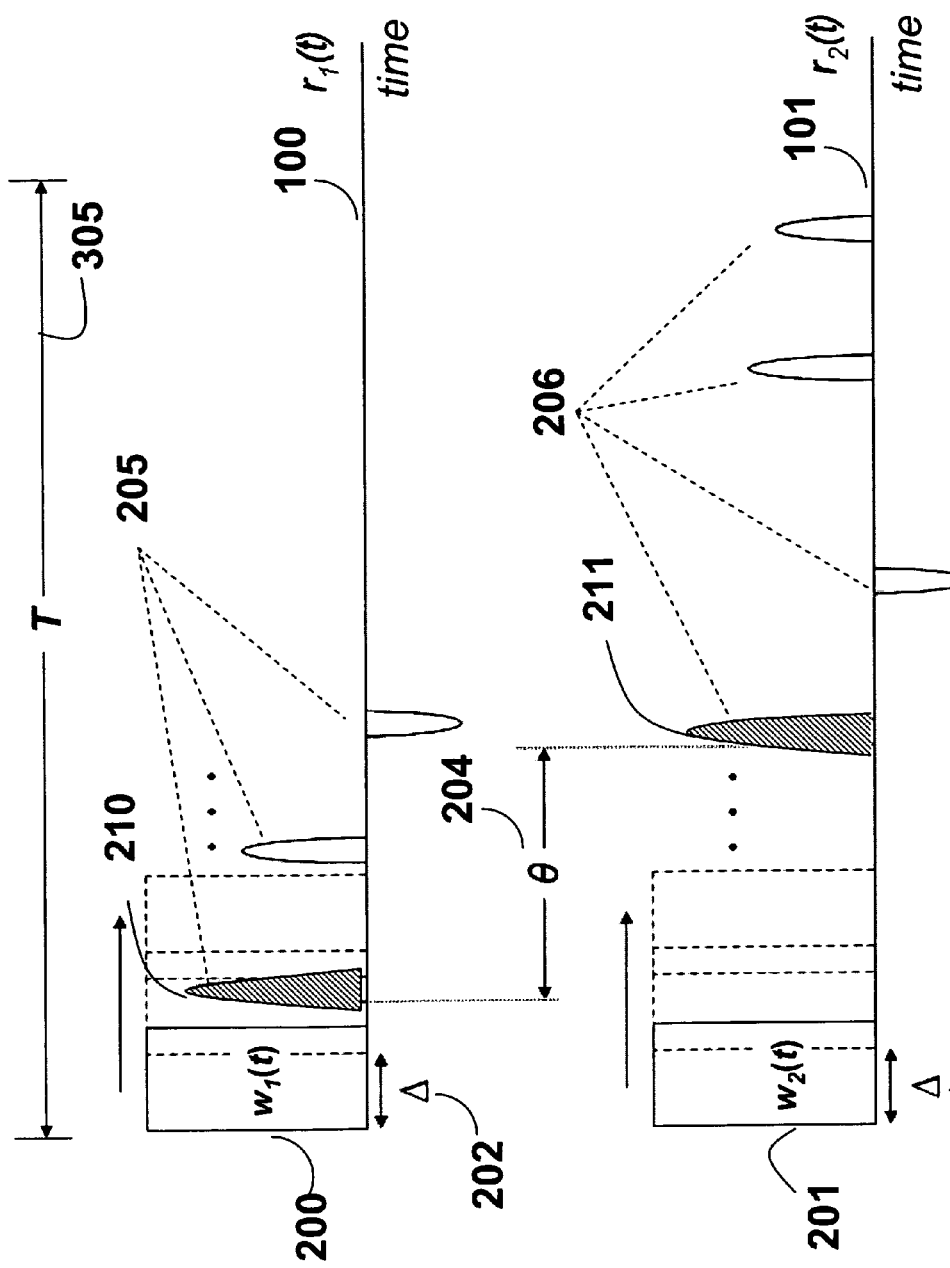
FIG. 2A is a timing diagram of windowing-based cross-correlation according to an embodiment of the invention.
Figure 2B:
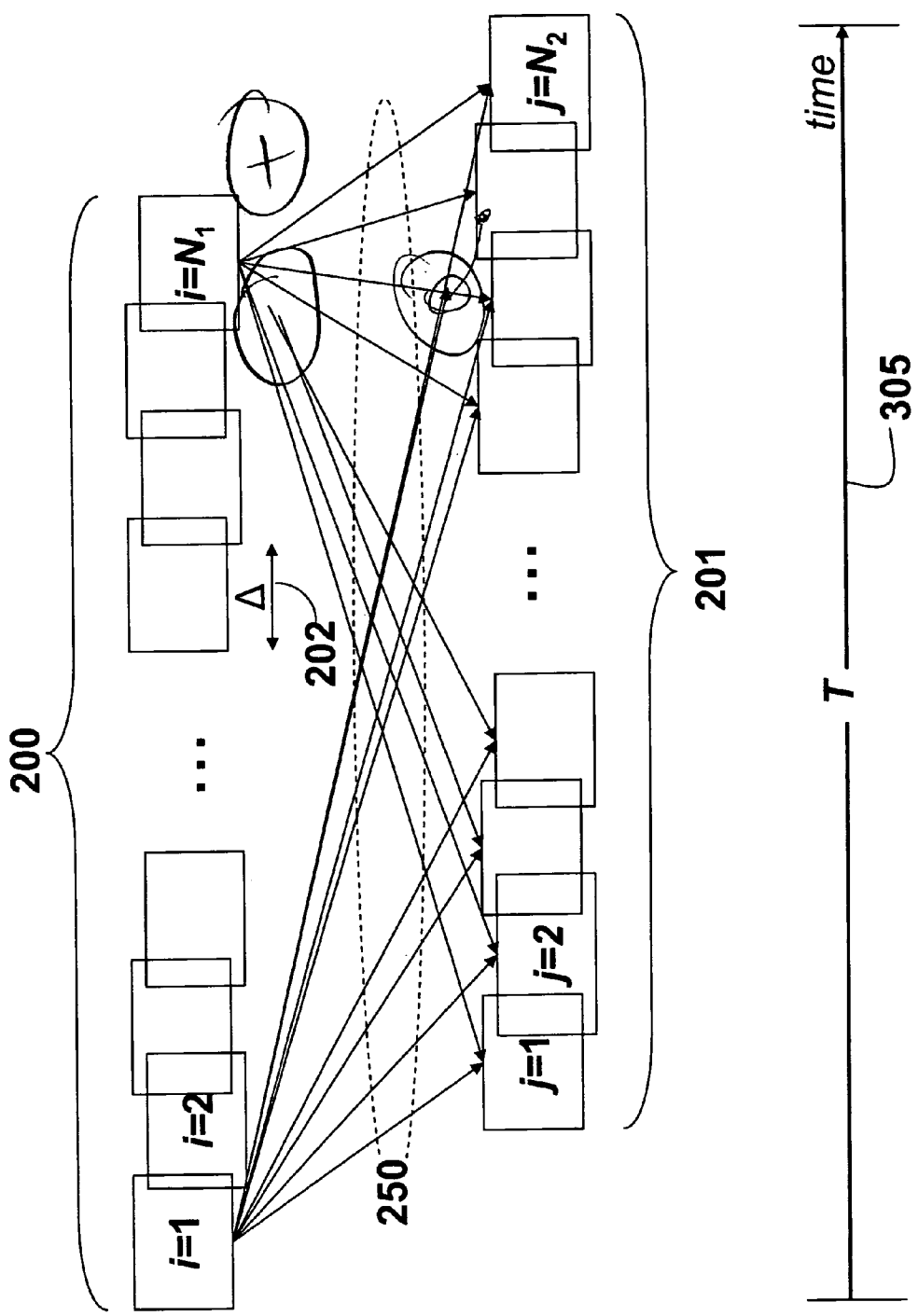
FIG. 2B is a block diagram of cross-correlation of windowed signals.
Figure 3:
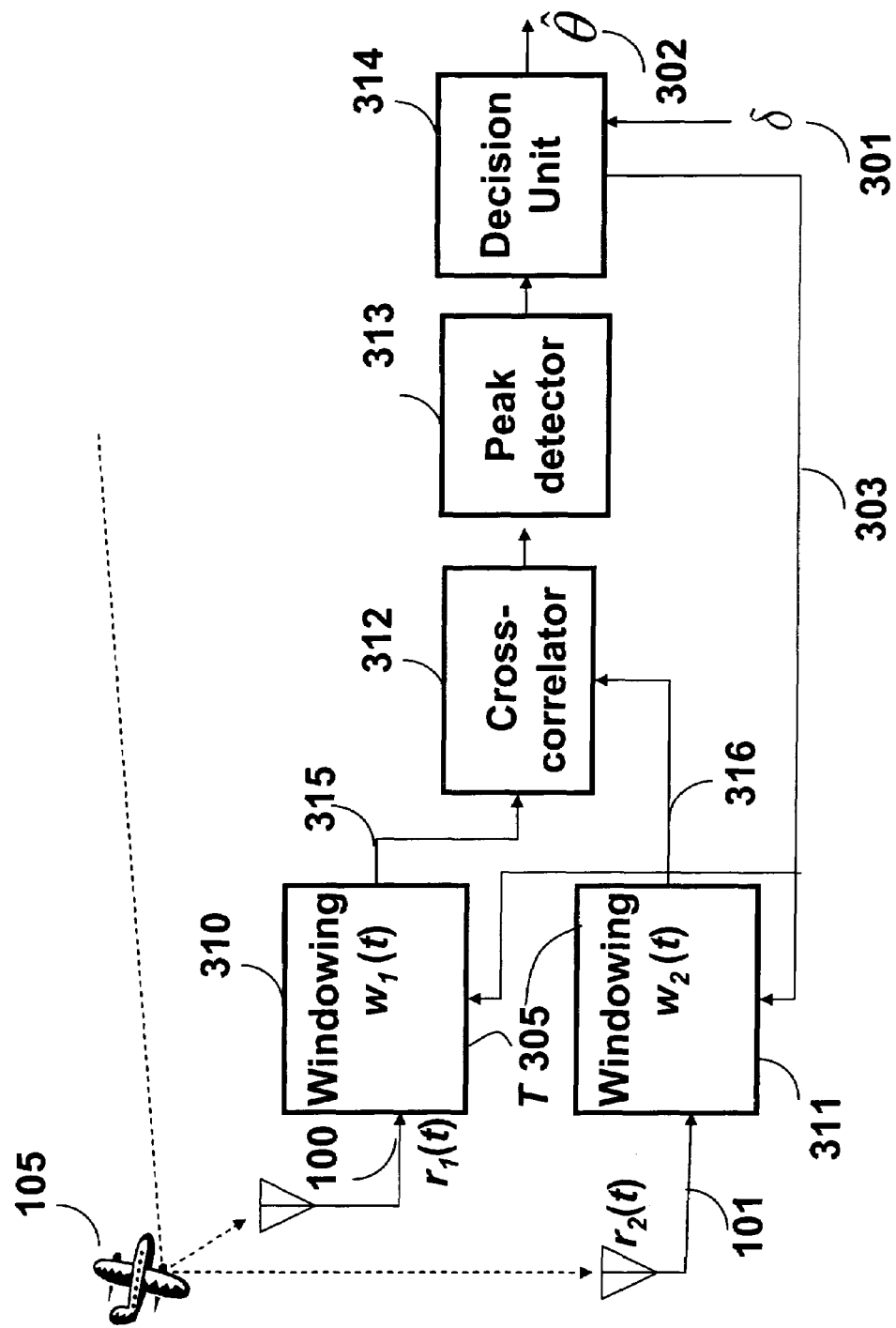
FIG. 3 is a block diagram of a sequential TDOA estimator according to an embodiment of the invention.

As shown in FIGS. 2A-2B and 3, we repeatedly apply 310-311 time-domain window functions $w_1(t)$ 200 and $w_2(t)$ 201 to a pair of received signals, a first signal $r_1(t)$ 100 and a second signal $r_2(t)$ 101 to produce windowed signals, 315-316. FIG. 2B shows the cross-correlations 250 for the first and last window positions in a correlation time interval 305. Typically, the window functions are identical and the correlation time interval 305 is shorter than the time between successive transmitted pulses.

As known in the art, and in contrast with filters used in conventional TDOA systems, a window function or an apodization function performs a multiplication in the time domain. The window function is zero-valued outside of the window interval. For instance, a window function that is constant inside the interval and zero elsewhere is called a rectangular window. When a signal is multiplied by the window function, the product is zero-valued outside the interval.

The received signals include pulses 205-206. Some of the pulses are multipath components that need to be resolved. The shaded pulses 210-211 are the "first" pulses received at the pair of sensors, presumably via a direct, line-of-sight-path. Later pulses are probably due to multipath propagation. We determine 312 cross-correlations between the windowed versions of the signals, as described below.

For each time instance t of the first window function $w_1(t)$ 200, the second window function $w_2(t)$ 201 is time shifted with respect of the first window function, over a correlation time interval T 305. As shown in FIGS. 2A-2B, the sequential window positions overlap. The time shift is an offset of an integer multiple of $\Delta$ seconds 202, with respect to the first window function. Then, the cross-correlations between the windowed signals are determined.

In contrast with the prior art, which detects a maximum peak for the entire cross-correlation interval, we detect the first pulses in the interval.

The main advantage of our windowing is that when there are resolvable multipath components 205 and 206 as shown in FIG. 2, the effects of multipath propagation can be reduced if an appropriate size is selected for the width of the window. For example, the "width" of the window function, i.e., the time duration over which the window function is applied, is approximately the same as the width (time) of a single pulse. The embodiments of the invention also cover the cases in which different offsets and different window sizes and functions are used. Typically, the window functions for the two signals are the same. Example window functions include rectangular, raised-cosine and Gaussian functions.

Because each cross-correlation is determined over a relatively small time window when compared to the time that multipath components for a single transmitted pulse can be received, interfering noise is less of a problem.

We consider windowing functions $w_1(t)$ 200 and $w_2(t)$ 201, and define the following the cross-correlation function:

$$R_{i,j}(x) = \int r_1(t)w_1(t-i\Delta)r_2(t-x)w_2(t-j\Delta-x)dt \quad (2)$$

for time instances $i=1, \ldots, N_1$ of the first signal, and time instances $j=1, \ldots, N_2$ for the second signal, where $\Delta$ is the time offset 202 between the applications of the window functions for our sequential cross-correlation determinations.

Let $\overline{R}_{i,j}$ and $\overline{\theta}_{i,j}$ be defined as $$\overline{R}_{i,j} = \max_x \{R_{i,j}(x)\}, \quad (3)$$

$$\overline{\theta}_{i,j} = \arg\max_x \{R_{i,j}(x)\}.$$

In other words, $\overline{R}_{i,j}$ denotes a cross-correlation peak for a single pair of windows at time instances i and j, and $\overline{\theta}_{i,j}$ is the time difference at which the peak value is attained.

In order to apply the sequential TDOA estimation according to embodiment of our invention, we appropriately map the cross-correlation peaks $\overline{R}_{i,j}$ to a time sequence $$\{\overline{R}_k\}_{k=1}^{N_1 N_2},$$

which corresponds to the inverse mapping $$\overline{R}_{i,j} = \overline{R}_{(i-1)N_2+j}.$$

The main motivation for the sequential mapping is that in the windowed signals the first pulses are received via direct signal paths, and later pulses are presumed to be multipath components. Therefore, the detection of just the first pulses can reduce the effects of multipath propagation.

After the sequential mapping, the first peak that exceeds a threshold $\delta$ is used to estimate the TDOA $\hat{\theta}$ as follows:

$$\hat{\theta} = \overline{\theta}_{f(\bar{k}),g(\hat{k})},$$

where $$\hat{k} = \min_k \{k \in \{1, \ldots, N_1 N_2\} | \overline{R}_k > \delta\}$$

and f(.) and g(.) denote appropriate mapping functions.

In other words, by sequentially mapping the windowed cross-correlation peaks, we convert TDOA estimation problem into a first pulse detection problem. Detecting the first pulse is effective when multipath propagation exists.

FIG. 3 shows a system and method for our sequential TDOA estimation. The first signal $r_1(t)$ 100 and the second signal $r_2(t)$ 101 are received by corresponding sensors from the target object 105. The signals can be reflected or transmitted by the target.

The window functions 200-201, as described above, are applied repeatedly to the first and second received signals by a pair of windowing blocks 310 and 311 for different time instances over the correlation interval T 305, to produce first and second windowed signals 315-316, respectively. The windowed signals 315-316 are cross-correlated 312 with each other for each application of the window function.

A peak detector 313 determines a peak of the absolute value of the cross-correlation function for the first and second windowed signals 315-316. The peaks arrive at a decision unit 314 sequentially. Each incoming peak value is compared to a predetermined threshold $\delta$ 301 by the decision unit 314. The first peak value that is greater than the threshold corresponds to the delay 204 between first pulses in the received signals, and is output as the TDOA estimate $\hat{\theta}$ 302.

If the peak value is not greater than the threshold $\delta$ 301, the decision unit 314 sends a feedback signal 303 to the windowing blocks 310 and 311, which can adjust the offset and/or widths of the window functions and the correlation time intervals for the next cross-correlation operation, and the processing continues until the threshold $\delta$ 301 is exceeded. If the threshold is not exceeded for any of the peaks, the receiver can either select the delay corresponding to the maximum of the peak values, or the receiver can decrease the threshold and repeat the process.

To determine the position of the target object, the above procedure needs to be applied to at least three pairs of received signals. This requires three sensors to obtain TDOA estimates, and one reference sensor. Then, a solution of hyperbolic equations specified by the TDOA estimates determines the position of the target.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a position of a target object, comprising the steps of:
    applying repeatedly a window function to a first signal and a second signal of a pair of radio signals received at a pair of passive sensors from a target object while time shifting the window function during a correlation time interval to produce a first windowed signal and a second windowed signal for each application of the window function;
    cross-correlating each first windowed signal with each second windowed signal to determine a peak for each cross-correlation;
    comparing, sequentially in time, the peaks to a predetermined threshold to detect a first pulse in the first signal and a first pulse in the second signal, a delay between the first pulses indicative of a position of the target object; and
    outputting the position of the target.

2. The method of claim 1, further comprising:
    adjusting a width of the window function while applying.

3. The method of claim 1, further comprising:
    adjusting an amount of the time shifting while applying.

4. The method of a claim 2, in which the width of the window function is approximately equal to a width of the first pulses.

5. The method of claim 1, in which each signal in the pair has the first pulse received via a direct, line-of-sight-path, and in which later pulses in the correlation time interval are due to multipath propagation.

6. The method of claim 1, further comprising:
    adjusting a size of the correlation time interval while applying.

7. The method of claim 1, in which the window function performs a multiplication on the first and second windowed signals in the time domain.

8. The method of claim 1, in which the window function is rectangular.

9. An apparatus for determining a position of a target object, comprising the steps of:
    a first sensor configured to receive to a first signal of a pair of radio signals received from a target object;
    a second sensor configured to receive to a second signal of the pair of radio signals;
    means for applying repeatedly a window function while time shifting the window function during a correlation time interval to produce a first windowed signal and a second windowed signal for each application of the window function;
    means for cross-correlating each first windowed signal with each second windowed signal to determine a peak for each cross-correlation;
    means for comparing, sequentially in time, the peaks to a predetermined threshold to detect a first pulse in the first signal and a first pulse in the second signal, a delay between the first pulses indicative of a position of the target object; and
    means for outputting the position of the target.

* * * * *